Figure 1:
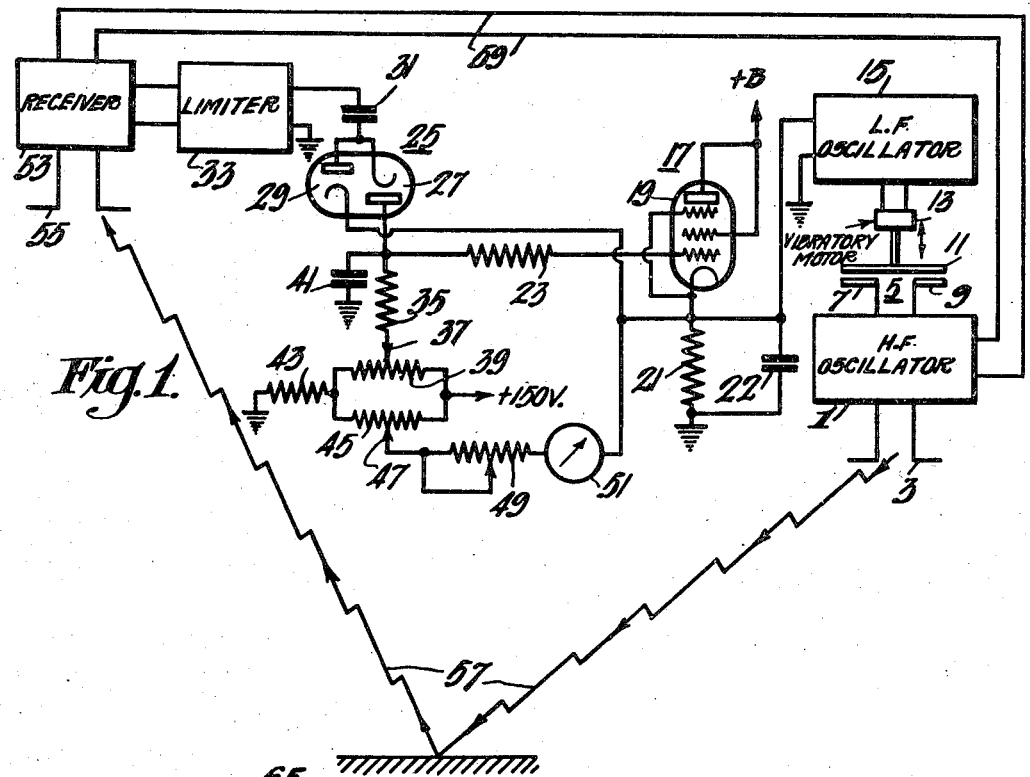

Dec. 7, 1948.  W. R. MERCER  2,455,693

DISTANCE DETERMINING SYSTEM

Filed July 26, 1945

Inventor
William R. Mercer
By
C. D. Tuska
Attorney

Patented Dec. 7, 1948

2,455,693

UNITED STATES PATENT OFFICE 2,455,693

DISTANCE DETERMINING SYSTEM

William R. Mercer, Boston, Mass., assignor to Radio Corporation of America, a corporation of Delaware Application July 26, 1945, Serial No. 607,215

6 Claims. (Cl. 343—14)

This invention relates to systems for measuring distance by reflection of frequency modulated radiation, and more particularly to improvements in the art wherein the frequency modulation sweep width is controlled as a function of the distance being measured.

In general, frequency modulation distance measuring systems operate by transmitting a frequency modulated wave which is reflected back to the transmitting point and there combined with the wave being transmitted. Since the transmitted wave is continually varying in frequency, the beat frequency difference between the transmitted wave and the received wave is a measure of the distance over which the reflected wave travels. The greater the distance, the higher is the beat frequency.

After detection, the beat frequency signal is amplified and applied to a frequency responsive indicator. The amplifier must operate over a frequency range corresponding to the range of distances to be measured. Furthermore, sufficient amplification must be provided to raise the level of the beat produced by the weakest signal, i. e. that reflected from the greatest distance, to an amplitude high enough to operate the indicator.

One of the limiting factors of amplification is the noise arising within the amplifier. The noise voltage in the output of an amplifier is proportional to the product of the gain and the square root of the frequency band width over which amplification is provided. When the noise level becomes of the same order of magnitude as the signal, further increase in gain is not feasible without reduction of the band width.

Accordingly it has been proposed to reduce the band width over which amplification is required, by reducing the width of the frequency modulation sweep band as a function of the distance being measured. Reference is made to U. S. Patent 2,257,830, issued October 7, 1941, to I. Wolff et al., and entitled Frequency modulated radio altimeter. The reduction of modulation sweep width with distance permits a corresponding reduction in the band which must be passed by the receiver amplifier, and consequently an increase in the amplifier gain, providing improved operation at the greater distances.

The circuit shown in the above-mentioned Wolff et al. patent includes a D.-C. amplifier connected to the frequency meter and a variable gain A.-C. amplifier connected to be controlled thereby. This involves several tubes and circuit components, requiring additional space and contributing additional weight, both of which factors are undesirable in an aircraft installation. A further problem which arises in variable band F.-M. radio altimeters is that of "locking out" which will occur if the reflected signal momentarily fades out at a high altitude.

The principal object of this invention is to provide an improved method of and means for indication of distance in response to the beat between transmitted and reflected frequency modulated signals.

Another object is to provide an improved method of and means for controlling the modulation sweep width in a frequency modulation distance measuring system.

Figure 2:
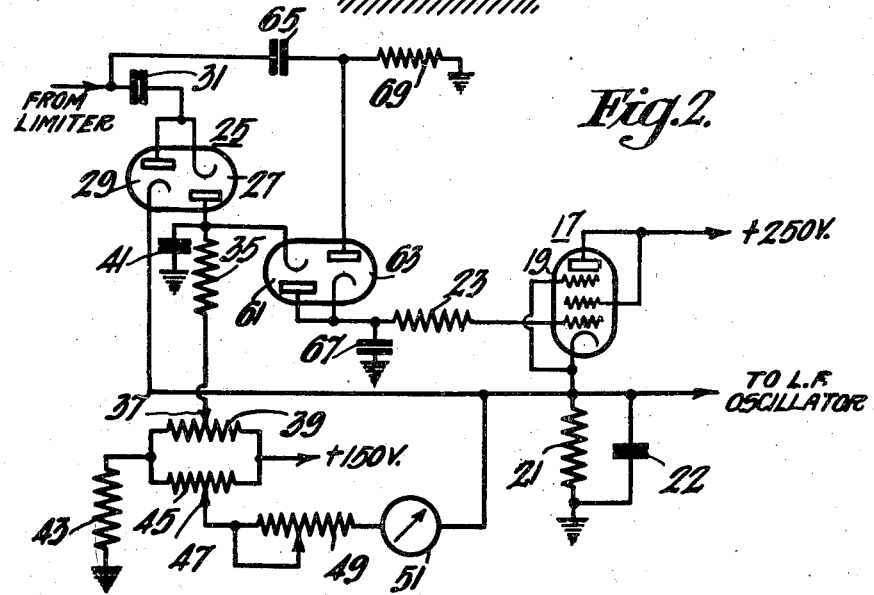

These and other objects will become apparent to those skilled in the art upon consideration of the following description, with reference to the accompanying drawing of which:

Figure 1 is a schematic diagram of a distance measuring system incorporating one embodiment of the invention, and Figure 2 is a schematic circuit diagram of a modification of Figure 1.

Referring to Figure 1, a high-frequency oscillator 1 is coupled to a transmission antenna 3. The resonant frequency determining circuit of the oscillator 1 is connected across a variable capacitor 5 which comprises stationary plates 7 and 9 and a movable plate 11. The plate 11 is connected to a vibratory motor 13 which is connected to the output circuit of a low frequency oscillator 15.

Anode potential for the oscillator 15 is supplied from the output circuit of the cathode follower type D.-C. amplifier 17. The amplifier 17 comprises an electron discharge tube 19 with a load resistor 21 connected in the cathode circuit. Since the entire output voltage of the amplifier 17 appears across the resistor 21 and in such polarity as to oppose the input to the amplifier, the voltage between the cathode and ground is maintained substantially equal to the voltage between the control grid and ground at all times. The control grid of the tube 19 is connected through a current limiting resistor 23 to a counter circuit 25 comprising diodes 27 and 29.

The cathode of the diode 27 and the anode of the diode 29 are coupled together through a capacitor 31 to the output circuit of a limiter 33. The anode of the diode 27 is connected through a resistor 35 to a variable tap 37 on a voltage divider 39. A capacitor 41 is connected between the anode of the diode 27 and ground. The cathode of the diode 29 is connected to the cathode of the D.-C. amplifier tube 19. The voltage divider 39 is connected to a point of positive potential on an anode supply source, not shown, and through a resistor 43 to ground. A second voltage divider 45 is connected across the voltage divider 39 and is provided with a variable tap 47 which is connected through a variable resistor 49 and a D.-C. meter 51 to the cathode of the tube 19. A receiver 53, arranged to respond to signals transmitted by the oscillator 1, is provided with an antenna 55 and is coupled to the input circuit of the limiter 33. A transmission line 59 is connected from the oscillator 1 to the receiver 53.

The operation of the above described system is as follows:

The oscillator 15 energizes the motor 13, causing the capacitance between the plates 7 and 9 of the capacitor 11 to vary cyclically and causing corresponding variations in the frequency of the oscillator 1. The frequency modulated output of the oscillator 1 is radiated by the antenna 3 and travels as indicated by the lines 57 to the reflecting object, such as the surface of the earth where it is reflected back to the antenna 55. Energy from the oscillator 1 is also fed directly to the receiver 53 through the line 59. The two inputs to the receiver 53 differ in average frequency by an amount which is proportional to the rate of change of frequency of the oscillator 1 and the difference in lengths of the two paths 57 and 59.

The receiver 53 provides a beat frequency output which is the difference of the two input frequencies. The output of the receiver 53 is limited by the limiter 33, providing substantially square wave voltage. During each positive half cycle of the square wave output of the limiter 33, the capacitor 31 is charged through the diode 29 and the network comprising resistor 21 and capacitor 22. During each negative half cycle of the square wave output of the limiter 33, the capacitor 31 is discharged and charged in the opposite direction through the diode 27 and the capacitor 41. The resulting charge on the capacitor 41 immediately starts to leak off through the through resistors 35, 37 and 43. However, the capacity of the capacitor 41 is made sufficiently large so that a relatively long period is required for substantial discharge.

Thus with successive charging and discharging of the capacitor 31 in opposite directions, the charge on the capacitor 41 is rapidly built up to a value such that the average discharge current through the resistor 35 is equal to the average charging current through the capacitor 31. The amount of charge delivered to the capacitor 41 during each cycle of the limiter output is the same. Therefore, the higher the frequency, the greater the average rate of charge of the capacitor 41 and the higher the voltage.

As the voltage across the capacitor 41 increases to an appreciable fraction of the amplitude of the square wave voltage, further increase of frequency would tend to produce less and less increase in the voltage across the capacitor 41, if the cathode of the diode 29 were maintained at a constant potential. This effect is avoided by returning the cathode of the tube 29 to the cathode of the tube 19 which, as explained above, follows the potential of the control grid of the tube 19, which in turn follows the potential of the anode of the diode 27. It should be noted that the potentials at the anode 27 and the control grid of the tube 19 become increasingly negative with respect to ground with increase in frequency.

The tap 37 is adjusted so that the voltage across the resistor 21 is such that the desired sweep width is obtained when the voltage across the resistor 35 corresponds to the maximum distance or altitude to be indicated by the equipment. The tap 47 is then adjusted on the voltage divider 45 to make the meter 51 read zero when the voltage across the resistor 35 corresponds to zero altitude or the minimum distance to be indicated by the equipment. It should be noted that the beat frequency is not zero at zero distance, owing to delays in the transmission lines to the antennas, and to the fact that the antennas are above the level of the landing gear in a practical aircraft installation.

With the voltage across the resistor 35 again corresponding to maximum distance, the resistor 49 is adjusted so that the meter 51 reads full scale. Now, for any particular indication of the meter 51, a corresponding voltage is present across the resistor 21, and the sweep width corresponding to that meter indication is always the same.

As the frequency of the square wave voltage increases, corresponding to increase in the distance, the potentials of the anode 27 and the control grid and cathode of the tube 19 become less positive with respect to ground and the current through the meter 51 increases. At the same time, as the potential of the cathode of the tube 19 becomes less positive, the anode voltage supplied to the low frequency oscillator 15 is decreased. Consequently the output of the oscillator 15 decreases in amplitude, causing a corresponding decrease in the amplitude of the output of the motor 13, and hence a similar decrease in the width of the band through which the frequency of the oscillator 1 is swept. This reduction in the modulation sweep width causes a corresponding reduction in the rate of change of frequency, reducing the incremental sensitivity of the system, in beat frequency cycles per foot, with increase in distance.

Thus the system of Figure 1 provides variable band operation with a minimum of additional apparatus. The adjustments for zero distance and zero meter setting are made electrically, avoiding the disadvantages of mechanical zero suppression in compensating for residual distance signals.

Figure 2 shows a modification of the system of Figure 1, employing a counter circuit providing selective damping of the indicator so that momentary loss of signal will not alter the D.-C. output. The counter circuit of Figure 2 is substantially that claimed in copending U. S. application Serial No. 380,834, filed February 27, 1941, now Patent No. 2,403,557, dated July 9, 1946, by R. C. Sanders, Jr., and entitled Frequency determining devices. The portions of Figure 2 which correspond to Figure 1 are designated by similar reference numerals.

An additional diode 61 is provided with its cathode connected to the anode of the diode 27 and with its anode connected to the control grid of the tube 19. Another diode 63 is provided with its anode coupled through a capacitor 65 to the limiter output circuit and its cathode coupled to the control grid of the tube 19. A capacitor 67 is connected between the cathode of the diode 63 and ground, and a resistor 69 is connected from the anode of the diode 63 to ground.

In the circuit of Figure 2 the capacitor 65 and the diode 63 act similarly to the capacitor 31 and the diode 27, charging the capacitor 67 positive with respect to ground. As long as the potential at the cathode of the diode 63 is less positive than the potential at the anode of the diode 27, the capacitor 67 discharges only through leakage, and the presence of signal from the limiter will cause the capacitor 67 to charge up until the cathode of the diode 63 reaches the potential of the anode of the diode 27, whereupon the diode 61 becomes conductive and prevents the cathode of diode 63 from becoming further positive with respect to ground. The voltage across the capacitor 67 is thus held equal to that across the capacitor 41, corresponding to the distance. If the frequency of the input increases, owing to increase in distance, the anode of the diode 27 becomes less positive with respect to ground and the capacitor 67 discharges through the diode 61 until the potential at the cathode of the diode 63 is again equal to that at the anode of the diode 27.

If the signal fails momentarily, the anode of the diode 27 becomes less negative, or in other words further positive, with respect to ground, the diode 61 remains non-conductive, and the potential across the capacitor 67 remains constant, subject only to leakage, at the voltage corresponding to the distance last measured before the signal failed. Thus the voltage to the tube 19 remains constant, the meter indication remains steady, and the band width does not change during short periods of signal failure.

The advantage of employing the above circuit becomes apparent when it is considered what would otherwise happen upon momentary signal failure. The effect of the band width reduction with increase in distance is such that as the distance increases indefinitely, the beat frequency asymtotically approaches a limit. The pass band of the receiver 53 is correspondingly limited, for reasons explained above. If there were no selective damping of the indicator circuit, momentary failure of signal would cause the voltage across the cathode resistor to increase to its maximum value. This would increase the modulation band width to that corresponding to zero distance, and the beat frequency would accordingly increase to a value outside the pass band of the receiver. This would cause the indicator to read zero or negative distance until the craft returned to some point close enough so that the beat frequency would pass through the receiver 53. With the circuit of Figure 2 this is prevented, since the modulation band width remains constant during momentary signal failure.

Thus the invention has been described as an improved indicator and band width control circuit for variable band F.-M. radio distance measuring systems, such as altimeters. The indicator circuit includes a meter connected in a bridge circuit with a linear counter, providing the advantages of electrical adjustment for zero distance and meter sensitivity. The modulation band width is controlled by applying the amplified counter output voltage to the anode supply circuit of the modulating oscillator. With this arrangement one counter and amplifier circuit combines both the functions of band compression and meter indication. Since the counter is linear in operation, the meter calibration is independent of residual distance signal.

I claim as my invention:

1. Radio distance measuring systems of the frequency modulation type including means for transmitting radio waves toward an object to be reflected therefrom, means for receiving said transmitted waves directly and after a reflection, frequency modulator means connected to said transmitting means for varying the frequency of the transmitted waves, means connected to said receiving means for producing in response to the output thereof, a unidirectional voltage which is less than a predetermined voltage by an amount proportional to the difference in frequency between said direct and reflected waves, a source of adjustable direct current voltage, a direct current meter, means for applying said first-mentioned unidirectional voltage and said adjustable voltage differentially to said meter, a low frequency oscillator connected to said frequency modulator means, and means for applying said first-mentioned unidirectional voltage to the anode supply circuit of said low frequency oscillator.

2. A combined indicator and band compression circuit for radio altimeters of the frequency modulator type comprising a counter circuit connected to produce a voltage which is less than a predetermined value by an amount proportional to the frequency of the input to said counter circuit, means for adjusting said predetermined value including a local source of direct current voltage and an adjustable voltage divider connected to said source and to said counter circuit, a cathode follower type amplifier connected to said counter circuit to produce a voltage substantially equal to the output of said counter circuit while presenting a relatively low internal output impedance, a direct current meter, means for applying the output of said amplifier to said meter, a second voltage divider connected across said local source to derive therefrom a second adjustable direct current voltage, and means for applying said second adjustable direct current voltage to said meter in opposition to the output voltage of said amplifier.

3. The invention as set forth in claim 2, including an adjustable resistor connected in series with said meter to set the sensitivity thereof to conform with the response of said counter circuit and the scale calibration of said meter.

4. A radio distance measuring system of the frequency modulator type including a transmitter, a receiver, a frequency modulator connected to said transmitter for varying the frequency of the signals transmitted thereby, a counter circuit connected to said receiver to produce in response to the output thereof a voltage which is less than a predeterminable voltage by an amount proportional to the frequency of the output of said receiver, a cathode follower type amplifier connected to said counter circuit to produce a voltage substantially equal to the output of said counter circuit while presenting a relatively low internal output impedance, a low frequency oscillator connected to said frequency modulator, and means for applying the output of said amplifier as anode supply potential to said low frequency oscillator.

5. A radio distance measuring system including a frequency modulator, a combined indicator and band compression circuit comprising a counter circuit for producing a unidirectional output voltage which is less than a predetermined voltage by an amount proportional to the frequency of the input to said counter circuit, a cathode follower type amplifier connected to said counter circuit to produce a voltage substantially equal to the output of said counter circuit while presenting a relatively low output impedance, for a low frequency oscillator connected to said frequency modulator, means for applying the output of said amplifier to the anode supply circuit of said low frequency oscillator and means for indicating the difference between said predetermined voltage and the output voltage of said amplifier.

6. The invention as set forth in claim 5 wherein said connection between said counter circuit and said amplifier includes a capacitor connected across the input circuit of said amplifier and means for preventing change in the voltage across said capacitor during momentary failure of the input to said counter circuit.

WILLIAM R. MERCER.

REFERENCES CITED

The following references are of record in the file of this patent:

UNITED STATES PATENTS

| Number | Name | Date |
| --- | --- | --- |
| 2,268,643 | Crosby | Jan. 6, 1942 |